Sept. 15, 1959 B. H. GEELS ET AL 2,904,638

DEVICE FOR AUTOMATIC TELEPHONE EXCHANGES

Filed Nov. 18, 1954

3 Sheets-Sheet 1

INVENTOR

BERNARDUS HENDRIKUS GEELS

WILLEM HENDRIK JOHANNES NICOLAI

BY Fred M. Vogel

AGENT

Sept. 15, 1959 B. H. GEELS ET AL 2,904,638

DEVICE FOR AUTOMATIC TELEPHONE EXCHANGES

Filed Nov. 18, 1954

3 Sheets-Sheet 2

INVENTOR

BERNARDUS HENDRIKUS GEELS
WILLEM HENDRIK JOHANNES NICOLAI

BY Fred M. Vogel

AGENT

Sept. 15, 1959 B. H. GEELS ET AL 2,904,638

DEVICE FOR AUTOMATIC TELEPHONE EXCHANGES

Filed Nov. 18, 1954

3 Sheets-Sheet 3

INVENTOR

BERNARDUS HENDRIKUS GEELS

WILLEM HENDRIK JOHANNES NICOLAI

United States Patent Office 2,904,638

Patented Sept. 15, 1959

2,904,638

DEVICE FOR AUTOMATIC TELEPHONE EXCHANGES

Bernardus Hendrikus Geels and Willem Hendrik Johannes Nicolai, Hilversum, Netherlands, assignors, by mesne assignments, to North American Philips Company, Inc., New York, N.Y., a corporation of Delaware Application November 18, 1954, Serial No. 469,768

Claims priority, application Netherlands December 24, 1953

12 Claims. (Cl. 179—27)

Figure 1:
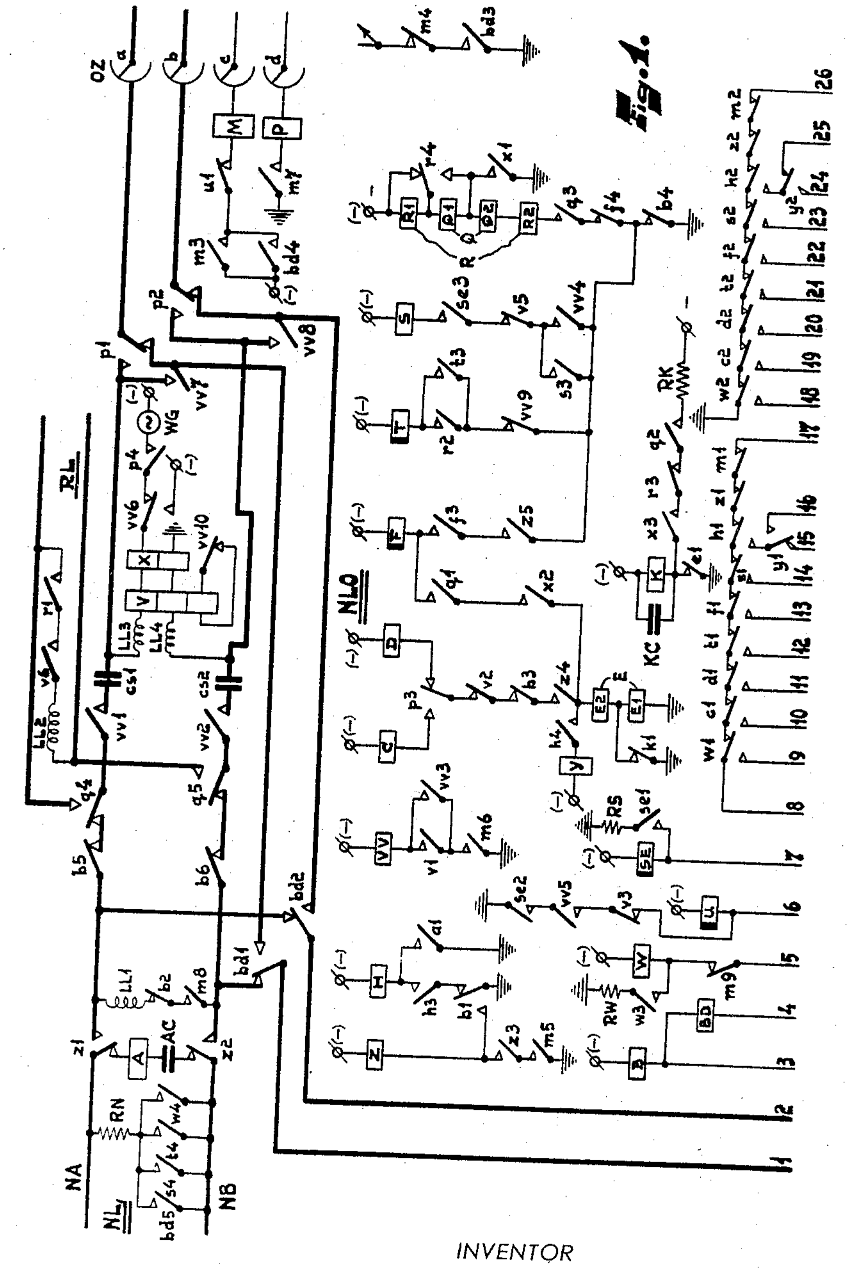

This invention relates to devices for automatic telephone exchanges and more particularly house exchanges in which connections between these and other exchanges can be established through the intermediary of an operator.

The connections between the exchanges are effected through lines which are indicated by the term "direct exchange lines" in distinction from the subscribers' lines between an exchange and subscribers' sets. Direct exchange line transmitters, i.e. direct exchange line coupling circuits, in the house exchanges are arranged to be connected respectively to the various direct exchange lines. In known systems the control desk of an operator comprises individual signalling means, for example in the form of one or more lamps, for each direct exchange line that can be controlled by her, together with an individual operating key for each direct exchange line, which enables the operator to establish a connection between her telephone set and a given direct exchange line coupling circuit to be selected by her. The control desk further comprises operating knobs which enable the operator to effect the required switching operations in the direct exchange line coupling circuit selected by her.

A comparatively large number of different conditions may arise before and during the through-connection between a direct exchange line and an internal telephone set such, for example, as:

(*a*) An incoming call is signalled as such on the control desk.

(*b*) The operator has answered this call.

(*c*) Connection of the direct exchange line to the desired number is not possible immediately, the called subscriber being busy. The direct exchange line is then switched into the waiting position, that is to say, its wires are interconnected and the operator can deal with other direct exchange lines.

(*d*) When the operator has connected the direct exchange line to the desired number, the telephone that is rung may be free, but if the call is not answered, the operator has to announce this to the calling subscriber after a short time.

(*e*) If the called number is busy, the operator can cut in and announce the new call. The through-connection between the direct exchange line coupling circuit and the number is established automatically, as soon as the called subscriber has terminated the existing call and replaced the receiver. However, if this does not happen, the operator must again cut in after a short time to warn the called subscriber again.

(*f*) The called subscriber has answered and the connection is established.

(*g*) The called subscriber during the call can ask the operator to cut in with the request to connect the direct exchange line to another number or to supply information.

(*h*) It is alternatively possible for the called subscriber to refer the call back to the operator without any comments.

(*i*) If a calling subscriber wishes to be connected to various numbers in succession (series call), the operator by performing a predetermined operation can ensure that the call returns to her control desk after termination of each call.

(*j*) The operator may connect a direct-exchange line call by mistake to a telephone number which is not admitted to the direct exchange line traffic. Furthermore, it may happen that the connection with a telephone number fails due to the operator performing a wrong operation.

The operator must be able to distinguish between all the above-mentioned conditions, in order to decide rapidly what has to be done in the case concerned. However, in known devices, the above-mentioned conditions are commonly signalled with only two or three lamps of different colours for each direct exchange line. For distinction purposes these lamps may be switched-on in combination either continuously or with slow or rapid flickering. As a rule, the above-mentioned conditions may be distinguished only in part as a result of the small number of different signalling possibilities.

The known devices have the disadvantage that, due to the presence of a large number of individual indicator lamps, the distinction between the different conditions requires strong concentration by the telephone operator and rapidly leads to fatigue. Furthermore, the aspect of the control desk is very unquiet due to differences in colour and frequency. If the number of lamps per direct exchange line were decreased, the operator could distinguish fewer conditions and this is not beneficial to the operating speed, more enquiring by the operator then being necessary. In the case of house exchanges comprising a large number of direct exchange lines which are controlled by a plurality of operators, it is desirable for obtaining satisfactory efficiency that each operator can fundamentally control all direct exchange lines or at least as large a number as possible thereof. In this case the number of signalling lamps becomes very large and the control desk is of large size and unsurveyable. Furthermore, the design of the operator's control desk is dependent upon the number of direct exchange lines, so that this design cannot be universal and notably must be modified if the number of direct exchange lines varies. In known devices it is not possible to distinguish between the different conditions by means of different acoustic signals, which is particularly important if the control desk has to be operated by a blind person.

The present invention mitigates the aforesaid disadvantages. In the device according to the invention, the fact that at least one direct exchange line coupling circuit is in a given particular condition is indicated on the operator's control desk by an indicating means which is common to all direct-exchange line coupling circuits to be controlled by the operator, provision being made of selecting means for actuating means for connecting the operator's control desk to a direct-exchange line coupling circuit which is in a determined particular condition signalled as such.

Consequently, the control desks only indicate the fact that at least one coupling circuit is in a determined condition, but they do not indicate the kind and the number of the coupling circuits. The direct-exchange lines thus are so-to-say anonymous. The operator, instead of selecting a determined direct-exchange line coupling circuit, thus selects any arbitrary coupling circuit which is in a particular condition, in other words she selects a condition. Since individual signalling means for each direct exchange line do not exist, the control desks may be of a universal design and be used for controlling any arbitrary number of direct exchange lines, which number may fundamentally be very large, since it is immaterial for operation and surveyability. Furthermore, the assembling process is extremely simple.

Not all of the different conditions are equally urgent. Thus, for example, an external call is less urgent than a condition in which the operator's intermediary is desired for an existing connection, since the expenses for a subscriber of a public exchange are reckoned only from the moment when his call is answered. Furthermore, a call which has been waiting for some time has preference over a call just made. A a rule, an operator first has to select the most urgent condition. This condition may be found in an extremely simple manner in the device according to the invention, since the condition indicator lamps may be arranged on the control desk in juxtaposition in the order of urgency. As a matter of fact, in known devices it is likewise possible first to deal with the most urgent condition, but distinction of this situation is not particularly simple in the case of a large number of direct exchange lines.

Furthermore, the circuit-arrangement may advantageously be such that only the condition which is most preferable for a given moment is indicated instead of all conditions which happen to exist at this moment. The control desk may in this case comprise a single selecting knob for selecting automatically a direct-exchange line coupling circuit which is in the most preferred condition. Consequently, an individual selecting key for each condition is not required. This is particularly important in the case of operation by blind persons, since the different conditions may then also be distinguished by acoustic signals instead of by lamps. The use of acoustic signals for distinction between conditions is not possible in known devices, the signalling therein being effected only for each direct exchange line. In known devices a blind telephone operator can in practice control only a limited number, for example 10, direct exchange lines due to a limited number of signalling possibilities only being available. However, in the device according to the invention, the number of direct exchange lines that can be controlled is fundamentally unlimited.

In order that the invention may be readily carried into effect, it will now be described with reference to the accompanying drawings showing diagrammatically and in simplified form one embodiment of the device according thereto.

Fig. 1 shows a direct exchange line coupling circuit NLO of an automatic house exchange in which external calls can be established through the intermediary of an operator.

Figure 2:
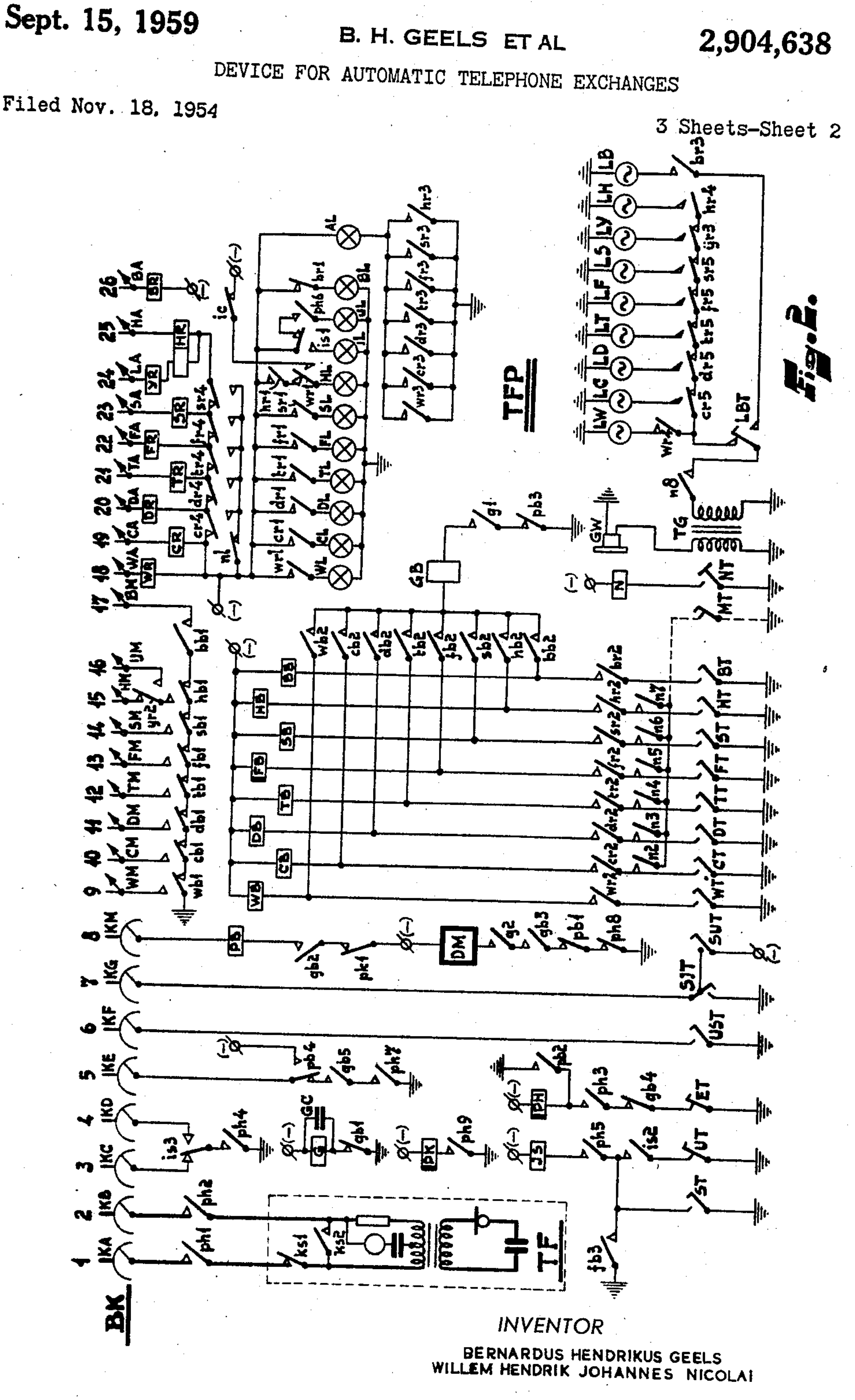

Fig. 2 relates to a control desk TFQ of a telephone operator.

Figure 3:
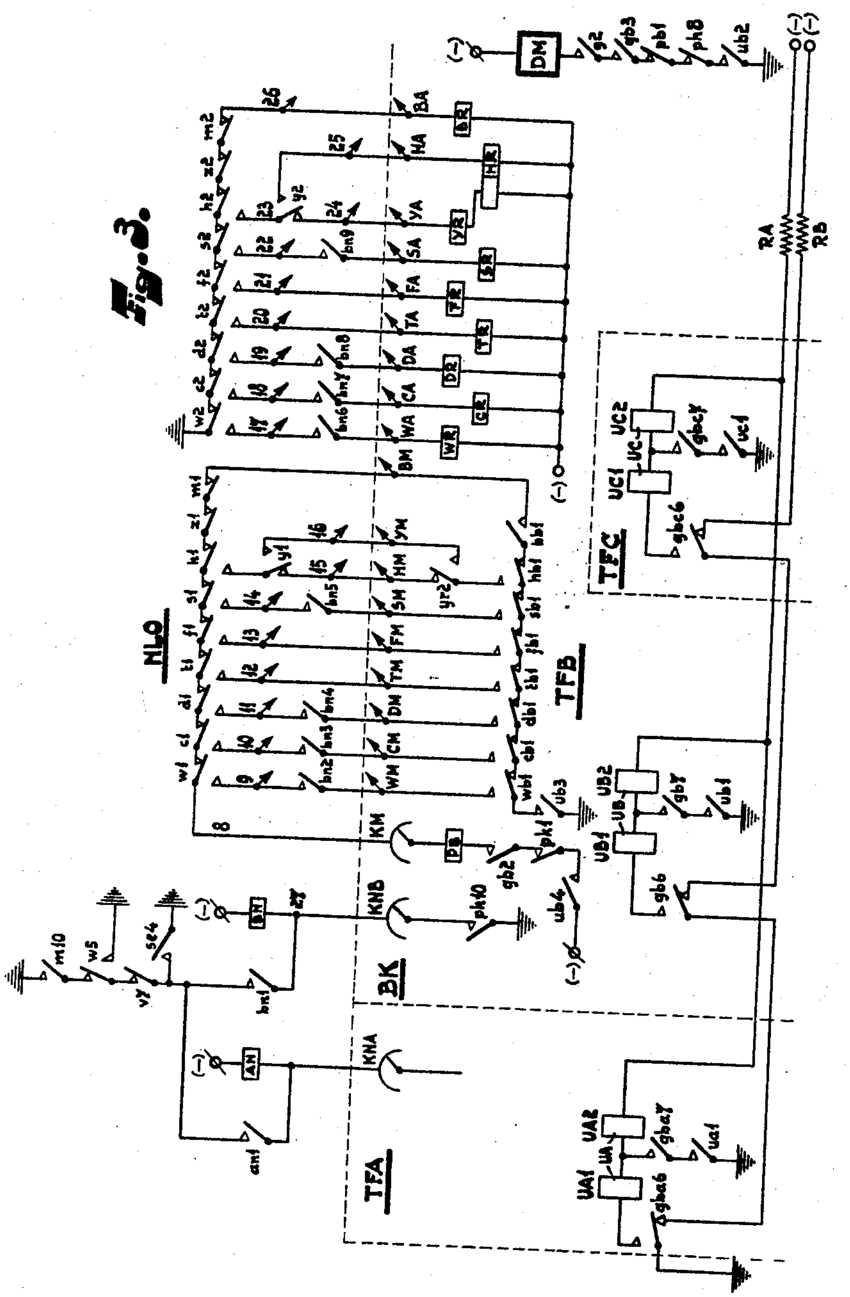

Fig. 3 shows an extension of the circuit-arrangement shown in Figs. 1 and 2 in the event of a plurality of control desks being available.

Figs. 1 and 2 must be imagined to be placed in superposition. The relays are indicated by capitals and their associated contacts by corresponding small letters followed by an index figure in distinction from the contacts of one and the same relay.

The direct exchange line coupling circuit shown in Fig. 1 is connected, on the one hand, to a direct exchange line NL leading to a public exchange and, on the other hand, to outlets of a certain number of line finders OZ (shown diagrammatically) and, as the case may be, to selectors of the house exchange which are not shown. The direct exchange line coupling circuit includes a number of situation relays W, C, D, T, F, S, Y, H of which the energisation condition is an indication that the direct exchange line coupling circuit is in a determined condition in which the intervention of a telephone operator is desired.

These conditions are:

(1) The direct exchange line coupling circuit is in the waiting condition (W).

(2) The called subscriber of the house exchange is free, but does not answer within 20 seconds (C).

(3) The called subscriber is busy, which situation has existed for more than 20 seconds after operation by the telephone operator (D).

(4) The subscriber of the house exchange places a call requiring the operator (F).

(5) The subscriber of the house exchange gives the connection back to the telephone operator and himself leaves the connection (T).

(6) The subscriber of the local exchange wishes to talk in succession with several subscribers of the house exchange and one of these calls has ended (S).

(7) There is an incoming external call which has been waiting fore more than 20 seconds (Y).

(8) There is an incoming external call which has been waiting for less than 20 seconds (H). This condition is indicated on the control desk only if there is no other direct exchang line in the condition Y. The various situations are indicated by the same letter as is the relay energised in this condition.

It will be evident that the number of conditions may fundamentally be extended or reduced at will. In order to emphasize the inventive idea, the circuit-arrangement in the embodiment shown is for the sake of simplicity of such design that a condition relay corresponds to each condition. However, in the condition Y the relays H and Y are energised. This construction is not very economic as regards the number of relays and contacts and in practice the various situations will therefore preferably be represented by a combination of energisation conditions of several relays.

The make contacts *w2*, *c2*, *d2*, *t2*, *f2*, *s2* of the relays W, C, D, T, F, S in all direct exchange line coupling circuits that can be controlled by the operator are connected by way of leads 18, 19, 20, 21, 22, 23 and multiple points WA, CA, DA, TA, FA, SA associated with the control desk to a winding of each of the relays WR, CR, DR, TR, FR, SR in the control desk (Fig. 2).

The make contact *h2* in the condition H of the coupling circuit is connected by of back contact *y2*, lead 25 and multiple point HA to a winding of relay HR of the control desk and in the condition Y of the transmitter it is connected by way of make contact *y2*, lead 24 and multiple point YA to a winding of relay YR of the control desk, which winding is connected in series with a second winding of relay HR. The other extremity of the winding of each of the relays WR and CR is connected to the negative terminal (—) of a battery (not shown), the positive terminal of which is connected to earth. The other extremity of the winding of each of the relays DR, TR, FR, SR and of the windings of relay HR is, so long as relay N, the object of which will appear hereinafter, is not energised, also connected to the said negative terminal either by way of back contacts *cr4*, *dr4*, *tr4*, *fr4*, *sr4* of preceding relays, or by way of back contact *n1*, one of the make contacts *cr4*, *dr4*, *tr4*, *fr4*, *sr4* and, as the case may be, one or more of the said back contacts. If relay N is energised, the relays DR, TR, FR and SR, YR and HR cannot be energised if one or more of the preceding relays CR, DR, TR, FR, SR are energised, their energising circuits then being interrupted by one or more back contacts *cr4*, *dr4*, *tr4*, *fr4*, *sr4*. If one or more direct exchange line coupling circuits are in a determined condition, the relays of the control desk corresponding to these conditions are energised, if relay N is not energised. However, if relay N is energised, one only of the relays CR, DR, TR, FR or SR and HR can be energised at a time or, as the case may be, relay Y and relay H. If relay N is not energised, both of the relays YR and HR are energised, if at least one of the direct exchange line coupling circuits is in the condition Y, whereas relay HR only is energised if at least one direct exchange line coupling circuit is in the condition H and there is no direct exchange line coupling circuit in the condition Y. Consequently, the condition Y automatically has preference over the condition H. However, if relay N is energised, the relays YR and HR can be energised only if none of the preceding relays CR, DR, TR, FR, SR is energised. The circuits of back contacts *w2*, *c2*, *d2*, *t2*, *f2*, *s2*, *h2*, *z2*, *m2* in all direct exchange line coupling circuits are multiple-connected by way of lead 26 and multiple point RA to a winding of relay BR. Relay BR is thus energised so long as not all of the direct exchange line coupling circuits are busy.

The make contacts *wr1*, *cr1*, *dr1*, *tr1*, *fr1*, *sr1* and the back contact *br1* are connected in series with condition indicator lamps WL, CL, DL, TL, FL, SL and a busy indicator lamp BL. If relay HR is energised and relay YR is not energised, the lamp HL is connected via make contact *hr1* and back contact *yr1* between the terminals of the battery. However, if relay YR and relay HR are both energised, the lamp HL is connected via make contact *yr1* between the terminals of the battery in series with the interruptor contact *ic* of a relay interruptor (not shown), which contact is opened periodically, so that the lamp HL burns intermittently. If one or more direct exchange line coupling circuits is in a determined condition, the corresponding condition lamp starts burning, on the understanding that the lamp HL burns constantly for indicating the condition H and burns intermittently if the more preferable condition Y exists. The relatively parallel make contacts *wr3*, *cr3*, *dr3*, *tr3*, *fr3*, *sr3*, *hr3* are connected in series with a general signal lamp AL, which lamp burns so long as at least one direct exchange line coupling circuit is in an, otherwise arbitrary, condition in which the assistance of the operator is called in. The control desk furthermore comprises two lamps IL and UL, which provide indications as to whether the operator's telephone set TF is connected to the internal or the external side of the direct exchange line coupling circuit controlled by the operator. The operator can select a direct exchange line coupling circuit which is in one of the conditions W, C, D, F, S by pushing one of the keys WT, CT, DT, TT, FT, ST and select a direct exchange line coupling circuit which is in the condition Y or H by means of a key HT (whereby the situation Y automatically has preference over the situation H, as will appear hereinafter) and furthermore select a free direct exchange line coupling circuit by means of a key BT. The connection between the operator's telephone set TF and a direct exchange line coupling circuit is established by a control selector BK associated with the control desk. The selector is adjusted by marking. A marking contact KM of the control selector corresponding to a determined direct exchange line coupling circuit is connected, when one of the said conditions occurs, via one of the make contacts *w1*, *c1*, *d1*, *t1*, *f1*, *s1*, via make contact *h1* and back contact *y1*, or via make contact *h1* and make contact *y1*, and further via one of the leads 9, 10, 11, 12, 13, 14, 15, 16 to one of the multiple points WM, CM, DM, TM, FM, SM, HM, YM, whereas the marking contact KM associated with a free direct exchange line coupling circuit is connected via the back contacts *w1*, *c1*, *d1*, *t1*, *f1*, *s1*, *h1*, *z1*, *m1* and lead 17 to the multiple point BM. When one of the condition selector keys WT, CT, DT, TT, FT, ST, BT is pushed, the corresponding relay WB, CB, DB, TB, FB, SB or BB is energised, which relay earths via its make contact *wb1*, *cb1*, *db1*, *tb1*, *fb1*, *sb1* or *bb1* the multiple point WM, CM, DM, TM, FM, SM, or BM which is associated with the condition concerned, thus closing a marking circuit extending from the marking contact of a direct exchange line coupling circuit in the desired condition to earth, and via this circuit a test relay PB is energised upon adjustment of the control selector BK in a manner which will be described more fully hereinafter. When the key HT is pushed, relay HB is also energised, so that either the multiple point YM is connected to earth via make contacts *yr2* and *hb1*, or the multiple point HM is earthed via back contact *yr2* and make contact *hb1*, according to whether both of the relays HR and YR are energised, or relay HR only is energised. A make contact *wr2*, *cr2*, *dr2*, *tr2*, *fr2*, *sr2*, *hr2* or *br2* is connected in series with the energising circuits of the relays WB, CB, DB, TB, FB, SB, HB, BB, so that these relays can be energised only if at least one direct exchange line coupling circuit is in the corresponding condition.

The control desk furthermore comprises a plurality of operating keys IT, UT, ET, UIT, SIT, SUT, which enable the operator to perform the switching operations which will be described hereinafter.

The operation of the circuit-arrangement is the following. In the case of an incoming call along a direct exchange line, ringing current is received through line wires NA and NB of the direct exchange line NL, thus causing energisation of an alternating-current relay A, of which one winding is connected in series with capacitor AC and of which the back contacts *z1* and *z2* are connected between the wires of the direct exchange line. The alternating-current relay A may be substituted, if desired, by an ordinary telephone relay included in a rectifying circuit. Relay H in the direct exchange line transmitter is energised via make contact *a1*. Relay H initiates via make contact *h1* the marking circuit for the control selector BK, whilst via the back contacts *b2*, *c2*, *d2*, *t2*, *f2*, *s2*, make contact *h2*, back contact *y2*, lead 25 and multiple point HA, the relay HR associated with the control desk is energised via one of its windings and the back contacts *sr4*, *fr4*, *tr4*, *dr4*, *cr4*, so that the calling indicator lamp HL and also the general signal lamp AL on the control desk start burning. Relay H closes a holding circuit for itself via make contact *h3* and back contact *b1*. Make contact *h4* closes a circuit extending from the negative terminal (−) of the battery via the winding of relay Y, make contact *h4* and the windings E2 and E1 of relay E to earth. Relay E, which, together with relay K, is included in a time-limiting circuit, is energised in this circuit but relay Y is not energised, since the winding E1 of relay E has a very high impedance. Relay K, normally, is energised via back contact *e1*, which energising circuit is interrupted when relay E is actuated. Connected parallel to the winding of relay K is a capacitor KC having a value such that relay K can be de-energised only after about 20 seconds. As will appear hereinafter, relay H is released when the call is answered by the telephone operator, so that contact *h4* opens again. Consequently, relay K is not released if the call is answered within 20 seconds, but it is released if the call has to wait for answer longer than 20 seconds. In the latter case back contact *k1* short-circuits the high-ohmic winding E1 of relay E, so that relay Y is energised in series with winding E2. By switching change-over contact *y1*, the multiple point YM instead of the multiple point HM is now connected to the marking contact KM of the control selector BK and this via the back contacts *w1*, *c1*, *d1*, *t1*, *f1*, *s1*, the make contact *h1*, the make contact *y1* and lead 16. Relay YR is now energised in series with the second winding of relay HR via the back contacts *w2*, *c2*, *d2*, *t2*, *f2*, *s2* and the make contacts *h2* and *y2*, lead 24 and the multiple point YA, windings of the relays YR and HR, and the back contacts *sr4*, *fr4*, *tr4*, *dr4*, *cr4*. As mentioned before, the lamp HL thus start to burn intermittently, so that the call is signalled on the control desk in a more urgent form.

The operator answers the call in the two cases under consideration by pushing the selecting key HT, so that relay HB is energised via key contact HT and make contact *hr2*. When selecting key HT is released, relay GB is energised in series with relay HB. The energising circuit extends from (−) via the winding of relay HB, make contact *hb2*, winding of relay GB, make contact *g1* and back contact *pb3* to earth. Relay G, normally, is energised via back contact *gb1*. After contact *gb1* has opened, relay G remains attracted for a certain period, its winding being shunted by capacitor GC. Relay GB initiates via make contact *gb2* the test circuit, whilst the rotary magnet DM of the control selector BK is energised via the make contacts *g2* and *gb3* and the back contacts *pb1* and *ph8*, so that the control selector BK is set into movement for finding a calling direct exchange line coupling circuit. When a direct exchange line coupling circuit is reached of which the marking contact KM is earthed via the marking circuit, the test relay PB is energised in a circuit extending from the negative terminal (—) of the battery via back contact *pk1*, make contact *gb2*, winding of relay PB, test arm and marking contact KM of the selector BK and further via the said marking circuit to earth. If none of the calling direct exchange lines has been waiting for more than 20 seconds, the marking circuit extends from the marking contact KM via lead 8, the back contacts *b1*, *c1*, *d1*, *t1*, *f1*, *s1*, the make contact *h1*, back contact *y1*, lead 15, multiple point HM, back contact *yr2*, make contact *hb1* and the back contacts *sb1*, *fb1*, *tb1*, *db1*, *cb1*, *wb1* to earth. However, if one or more calling direct exchange lines have been waiting for more than 20 seconds, relay YR is energised, so that the marking circuit just described is interrupted by the back contact *yr2* for coupling circuits which have been waiting for less than 20 seconds and the selector cannot therefore be adjusted to one of the said transmitters. The marking circuit of a coupling circuit in the Y situation extends from the marking contact KM via lead 8, the back contacts *w1*, *c1*, *d1*, *t1*, *f1*, *s1*, the make contacts *h1* and *y1*, lead 16, multiple point YM, the make contacts *yr2* and *hb1* and the back contacts *sb1*, *fb1*, *tb1*, *db1*, *fb1*, *wb1* to earth. When relay PB is energised, the back contact *pb1* interrupts the circuit for energising the rotary magnet DM, so that the movement of the control selector BK is stopped. Relay PH is energised via make contact *pb2* and relay GB is released due to back contact *pb3* being opened, as a result of which relay PB is also released. Relay PH through-connects via the make contacts *ph1* and *ph2* the line wires of the operator's telephone set TF to wipers KA and KB of the selector BK, closing a holding circuit for itself via make contact *ph3*, back contact *gb4* and key contact ET. Relay PK is energised via make contact *ph9*. The object of this relay will appear hereinafter. Make contact *ph6* closes in series with back contact *is1* a circuit via lamp UL, which thus starts burning to indicate that the operator's telephone set TF is connected to the external side of the direct exchange line coupling circuit. Relay B in the direct exchange line coupling circuit is energised via make contact *ph4*, back contact *is3*, wiper and contact KC of control selector BK and lead 3. Relay Z is energised via make contact *b1*, connecting the line wires NA and NB of the direct exchange line NL via the make contacts *z1* and *z2*, the back contacts *bd1* and *bd2*, leads 1 and 2, contacts and wipers KA and KB of control selector BK and the make contacts *ph1* and *ph2* to the operator's telephone set TF. Owing to the loop across the direct exchange line being closed via the operator's telephone set TF, the ringing current in the remote exchange is switched off. The back contacts *z1* and *z2* cause the circuit for energising relay A to be interrupted. Back contact *b3* opens the holding circuit of relay H. The release of relay H causes the marking circuit to be opened, whilst relay HR in the control desk is released and lamp HL extinguishes, unless another direct exchange line coupling circuit is still in the calling situation H or Y. Make contact *h4* switches off the relays E and Y. The telephone operator can now talk with the calling subscriber.

If the control selector would not have found a calling direct exchange line, for example due to another operator already having answered this call, relay G, of which the energising circuit has been opened by contact *gb1*, would be released in the control desk. Make contact *g1* would then have interrupted the circuit for the relays HB and GB and make contact *g2* would have opened the circuit for energising rotary magnet DM, with the result that the control selector would have returned to the position which existed before the telephone operator pushed the key HT.

After the operator has heard the desired internal number, she just pushes key IT, so that relay IS is energised via make contact *ph5*, which relay closes a holding circuit for itself via the make contacts *ph5* and *is2* and the key contact UT. Due to back contact *is1* being opened, lamp UL extinguishes, whereas due to make contact *is1* being closed, lamp IL is ignited to indicate that the operator is connected to the internal side of the direct exchange line coupling circuit. Relay BD in the direct exchange line coupling circuit is energised, in series with relay B, via lead 4, outlet contact and wiper KD of control selector BK, make contact *is3* and make contact *ph4*. The change-over contacts *bd1* and *bd2* connect the operator's telephone set TF via the make contacts *ph1* and *ph2*, wipers and contacts KA and KB of BK, the leads 1 and 2 and the back contact *p1* and *p2* to an outlet of a group of line finders OZ. Due to the closure of make contact *bd3*, a signal is given via back contact *m4* to one of the line finders OZ in a manner which is not illustrated, so that this line finder is set into movement for seeking the direct exchange line coupling circuit concerned, which is marked as calling in the contact bank of line finder OZ due to the closure of make contact *bd4* in series with back contact *u1* and winding of relay M. The loop across the direct exchange line NL is kept closed via make contact *bd5* and resistor RN. As soon as the line finder OZ has found the direct exchange line coupling circuit, relay M is energised and closes via make contact *m3* a holding circuit for itself independently of make contact *bd4*. Relay M furthermore closes via make contacts *m5* and *z3* a holding circuit for relay Z.

The telephone operator now receives dialling tone from the house exchange and selects the desired number by means of a dial (not shown) having contacts *ks1* and *ks2*. If the called subscriber is free, relay P is energised from the house exchange via wiper and contact *d* of line finder OZ, winding of relay P and make contact *m7* in a manner which is not illustrated. Furthermore, in the house exchange the line wires of the called subscriber are galvanically through-connected to the direct exchange line coupling circuit. Relay P through-connects the line wires via the make contacts *p1* and *p2*, so that the called subscriber receives ringing current from a ringing current generator WG via make contact *p4*, back contact *vv6*, winding of relay X, winding of relay V, inductance LL3, make contact *p1*, contact and wiper *a* of line finder OZ, the loop across the telephone set of the called subscriber in the house exchange, wiper and contact *b* of line finder OZ, make contact *p2*, inductance LL4, winding of relay V and winding of relay X. Since a third winding of relay V is short-circuited via back contact *vv10*, relay V is slow and cannot respond to the ringing current. As soon as the called subscriber removes the receiver, the loop concerned is closed and relay V energised. Relay X is not actuated, both its windings being connected differentially. Relay VV is energised via make contacts *v1* and *m6*, closing a holding circuit for itself via make contact *vv3* in series with make contact *m6*. The make contacts *vv1* and *vv2* through-connect the line wires of the direct exchange line, the change-over contact *vv6* switching-off the ringing current generator.

The make contacts *vv7* and *vv8* again connect the operator's telephone set TF to the outlet contacts *a* and *b* of line finder OZ, which connection upon the energisation of relay P had been temporarily interrupted by the back contacts *p1* and *p2*, in order to prevent the ringing current from being supplied to the operator's telephone set TF. The operator is now connected to the internal subscriber's set and can announce the call, subsequently leaving the connection by means of key ET, which interrupts the circuit for energising relay PH, so that this relay is released. If one or more other direct exchange line transmitters are waiting to be controlled, key ET need not be pushed, but she can select immediately another direct exchange line coupling circuit by pushing one of the keys WT, CT. DT, TT, FT, ST, HT, BT, after the release of which relay GB is energised, interrupting via contact *gb*4 the holding circuit of relay PH, so that this relay is released.

Due to make contact *ph*4 being opened, the relays B and BD in the direct exchange line coupling circuit are released, and due to make contact *ph*5 being opened, the relay IS in the control desk is released, so that the lamp UL extinguishes. The back contacts *b*5 and *b*6 through-connect the speech path between the direct exchange line and the called subscriber, thus establishing the desired speech connection between the direct exchange line NL and the subscriber of the house exchange via the make contacts *z*1 and *z*2, the back contacts *b*5 and *b*6, the back contacts *q*4 and *q*5, the back contacts *vv*1 and *vv*2, the capacitors CS1 and CS2, the make contacts *p*1 and *p*2, contacts and wipers *a* and *b* of line finder OZ and further connecting means in the house exchange which are not shown.

When the call is over, the internal subscriber replaces the receiver, so that relay V is released. Relay U is energized via back contact *se*2, make contact *vv*5, back contact *v*3. Contact *u*1 interrupts the holding circuit of relay M, thus causing this relay to be released and the connecting means in the house exchange to be released again in a manner which is not shown. Furthermore, the relays Z and VV are de-energised, followed by relay U.

Several conditions may occur during the establishment of the connection. If the operator would erroneously have chosen a wrong number or if it would appear after the connection between the control desk and the called subscriber's set had been established that the called subscriber must be reached via another telephone set, the operator can restore the condition which existed before she pushed the key IT by pushing key UIT, so that relay U in the direct exchange line coupling circuit is temporarily energized and causes relay M to be released due to back contact *u*1 being opened, with the result that the connection path in the house exchange is interrupted and the line finder OZ released again in a manner which is not shown.

Due to the release of relay M, a free line finder is switched in again via back contact *m*4 and make contact *bd*3. After this line finder has found the direct exchange line coupling circuit and the operator has again received dialling tone, she can again select an internal connection in the manner described hereinbefore.

If the called subscriber is busy, the operator receives a busy tone. Relay P is in this case not energised. The telephone operator may then cut in for announcing the call in a manner known per se, which is not illustrated. As an alternative, the telephone operator can tell the calling subscriber that the desired connection cannot be established. For this purpose she must first connect her telephone set again to the external side of the direct exchange line coupling circuit. She then pushes key UT, causing release of relay IS, followed by relay BD in the direct exchange line transmitter. When relay IS is released, lamp IL extinguishes and back contact *is*1 switches on the lamp UL via make contact *ph*6. The change-over contacts *bd*1 and *bd*2 through-connect the line wires of the operator's telephone set TF in the direct exchange line coupling circuit to the line wires of the direct exchange line.

If the operator, after having established connection with a calling line, is for some reason or other not immediately in a position to deal with the call completely, she can temporarily bring the direct-exchange line coupling circuit in the waiting condition and first control another direct-exchange line.

She then pushes one of the condition selector keys corresponding to a condition then existing of another exchange line, for example key CT. Relay CB is thus energised via make contact *cr*2 and key contact CT. After the key has been released, relay GB is energised via winding of relay CB, make contact *eb*2, winding of relay GB, make contact *g*1 and back contact *pb*3. Relay PH is thus de-energised due to back contact *gb*4 being opened. However, before relay PH releases its armature, there is established a circuit extending from earth via the make contacts *ph*7 and *gb*5, back contact *pb*4, wiper and contact KE of selector BK, lead 5, back contact *m*9 and the winding of relay W to (—), in which circuit relay W is energised. Relay WR in the control desk is thus energised via make contact *w*2, lead 18 and multiple point WA, whereafter make contact *wr*1 ignites the indicator lamp WL, in order to warn the operator that a direct exchange line coupling circuit is in the waiting condition. Relay W closes a holding circuit for itself via make contact *w*3 and resistor RW, closing via make contact *b*4 and resistor RN a direct-current path between the line wires NA and NB of the direct exchange line NL. The rotary magnet DM is energised via the back contacts *ph*8 and *pb*1 and the make contacts *gb*3 and *g*2, whereafter the selector is set into motion for finding a direct exchange line coupling circuit in the selected situation C.

If the key WT instead of key CT would be pushed, the marking contact KM associated with the direct exchange line coupling circuit which has just been brought into the waiting condition is connected via make contact *w*1, lead 9, multiple point BM and make contact *wb*1 to earth, since now relay WB in the control desk instead of relay CT is energised upon pushing key WT. In order to prevent relay PB from being energised via this circuit before the selector BK has been able to leave the condition concerned, in other words before the selector would be locked in the existing condition, back contact *pk*1 of relay PK is included in series with the circuit for energising relay PB. Relay PK is released with retardation after the release of relay PH, so that back contact *pk*1 is not closed until the selector has left the condition concerned.

The selector is subsequently adjusted in accordance with the selected condition. After the telephone operator has controlled another direct exchange line coupling circuit, she can interrupt the connection between her telephone set and this direct exchange line coupling circuit and again connect herself to a direct exchange line coupling circuit in the waiting condition by pushing key WT. Relay WB is thus energised, whereas, as described before, relay GB is energised when the key is released. Relay PH is de-energised due to relay GB being energised. However, assuming now that the coupling circuit last controlled be connected to a line finder OZ, so that relay M of this coupling circuit is energised. When relay PH is released, relay W in this coupling circuit cannot then be energised, since contact *m*9 is open, in other words the transmitter is not brought into the waiting situation.

The rotary magnet DM is energised again via the make contacts *g*2 and *gb*3 and the back contacts *pb*1 and *ph*8. The outlet of the selector BK corresponding to a direct exchange line coupling circuit in the waiting situation is marked via the aforementioned marking circuit extending from marking contact KM of selector BK via lead 8, make contact *w*1, lead 9 multiple point WM and make contact *wb*1. As soon as the direct exchange line coupling circuit has been found, relay PB in the control desk is energised, followed by relay PH. The process takes place in a manner analogous to that described for answering a call along a direct exchange line. In this case, however, when relay PB is energised, the relay W in the direct exchange line coupling circuit is also short-circuited via a circuit extending from (—) battery via make contact *pb4*, wiper and contact KE of selector BK and back contact *m9*, so that relay W is released. Relay W opens its make contact *w3*, so that this relay cannot respond again, when relay PB is released. If a telephone operator thus connects herself to a direct exchange line coupling circuit in the waiting condition, this condition is automatically eliminated.

The operator, after having selected the desired internal number, may also leave the connection immediately for controlling another direct exchange line by pushing the condition key corresponding to the situation of this direct exchange line, so that the relays PH and IS in the control desk and the relays B and BD in the direct exchange line coupling circuit are released in a manner described hereinbefore. The line wires NA and NB of the direct exchange line NL now keep interconnected galvanically via make contact *z1*, inductance LL1, back contact *b2*, make contact *m8* and make contact *z2*. Relay E of the time-limiting circuit is then energised again. If the called subscriber is busy, that is to say relay P is not energised, the circuit for energising relay E extends via the windings E1 and E2, make contact *z4*, the back contacts *b3*, *v2*, *p3* and the winding of relay D. However, if the called number is free, the energising circuit extends via the windings E1 and E2, make contact *z4*, the back contacts *b3* and *v2*, make contact *p3* and the winding of relay C. The relays C and D cannot be energised in the said circuits due to the high impedance of winding E1. If the call is not answered by the called subscriber within 20 seconds, relay K is released. Back contact *k1* short-circuits the high-resistance winding E1, resulting in either relay C or relay D being energised in series with winding E2 of relay E. Due to the closure of make contact *c2* or *d2*, relay CR or DR in the control desk is energised and lamp CL or DL on the control desk is ignited, so that the intermediary of the telephone operator is called in. If the called subscriber answers within 20 seconds, relay V is energised, so that the circuit for energising relay E is interrupted by contact *v2* and the connection between the subscribers is established in the ordinary way.

If the called subscriber was busy, but terminates the existing call, relay P is still energised when the receiver is replaced, so that this subscriber is called in the normal way.

However, if the call is not answered within 20 seconds, either lamp CL or lamp DL is ignited, as mentioned before. The telephone operator in this case can again connect herself to the direct exchange line by pushing key CT or DT, thus causing energisation of relay CB or DB, whereas when the key CT or DT is released, the relay GB is energised via make contact *cb2* or *db2*, whereafter the control selector BK seeks the corresponding direct exchange line coupling circuit in a manner analogous to that described for answering an incoming call. In this case, however, if the called subscriber was free, the marking circuit extends from the marking contact KM of selector BK via lead 8, back contact *w1*, make contact *c1*, lead 10, multiple point CM, make contact *cb1* and back contact *wb1* or, if the called subscriber is busy, from the corresponding marking contact MK via lead 8, the back contacts *w1* and *c1*, make contact *d1*, lead 11, multiple point BM, make contact *wb1* and the back contacts *wb1* and *cb1*. After the corresponding direct exchange line coupling circuit has been found, relay PB is energised in the manner already described, followed by the relays PH and B, and relay GB is de-energised, followed by relay PB.

During an existing call connection between an external subscriber and an internal subscriber, the telephone operator can be called back into the connection in two ways. The internal subscriber can pass the direct exchange line back to the operator and himself leave the connection by pushing the key on his set for a short time and subsequently replacing his receiver. When the key is pushed, the line wire *a* is connected directly to earth, energising the differential relay X in the direct exchange line transmitter. Relay Q is energised via make contact *x1*, winding Q1 of relay Q and back contact *r4*. When the key is released, relay X is de-energised, thus causing energisation of relay R, in series with relay Q, via the back contacts *b4* and *f4*, make contact *q3*, winding R2 of relay R, windings Q1 and Q2 of relay Q and back contact *r4*. Make contact *r4* short-circuits the winding, whilst the winding R1 of relay R is connected in series with the said circuit due to back contact *r4* being opened. After the internal subscriber subsequently has replaced the receiver, the relay V is released due to the loop across the subscriber's set being opened. Relay U is energised in the described manner via back contact *v3*, make contact *vv5* and back contact *se2*, whereafter back contact *u1* interrupts the circuit for energising relay M and the line finder OZ and further connecting means in the house exchange are released again, whilst relay P is also released. Make contact *m6* interrupts the holding circuit of relay VV, thus causing energisation of relay T via back contact *vv9* and make contact *r2*. Relay TR in the control desk is energised via the back contacts *w2*, *c2*, *d2*, make contact *t2*, lead 21 and multiple point TA, so that lamp TL is switched on via make contact *tr1*. The line wires NA and NB of the direct exchange line NL keep interconnected galvanically via make contact *t4* and resistor RN.

The telephone operator can connect herself to a direct exchange line coupling circuit in the situation T by pushing key TT, so that in this case relay TB is energised. The direct exchange line coupling circuit is now marked by a marking circuit extending from the marking contact KM via lead 8, the back contacts *w1*, *c1*, *d1*, make contact *t1*, lead 12, multiple point TM, make contact *tb1* and the back contacts *db1*, *cb1*, *wb1*. The selector is adjusted in a manner analogous to that described hereinbefore. After the selector has found the direct exchange line coupling circuit and relay B has been energised, relay Z is energised via make contact *b1*, the relays R, Q and T being released due to back contact *b4* being opened. The operator can now talk with the external subscriber and if necessary, pass the call on to another set in a manner as described hereinbefore.

It is also possible that the internal subscriber during an existing connection wishes to call in the assistance of the telephone operator and he himself wishes, at least for the time being, to remain in the connection. He then pushes the key on his set for at least 3 seconds. Upon pushing, the relays X and Q are energised in the manner described before. Relay E is energised via its windings E1 and E2, the make contacts *x2* and *q1* and the winding of relay F, which relay cannot respond in this circuit due to the high impedance of winding E1. Back contact E1 interrupts the circuit for energising relay K. Make contact *x3* closes via back contact *r3* and make contact *q2* the resistor RK parallel to capacitor KC and the winding of relay K. Relay K is the de-energised already after about 3 seconds instead of after 20 seconds. As soon as relay K is released, relay F is energised in series with the winding E2 of relay E. The energising circuit extends via back contact *k1*, winding E2 of relay E, make contacts *x2* and *q1* and the winding of relay F. Relay FR in the control desk is thus magnetised via the back contacts *e2*, *c2*, *d2*, *t2*, make contact *f2*, lead 22 and multiple point FA. Make contact *fr1* switches on the condition indicator lamp FL in the control desk to indidicate that the intermediary of the operator is desired. Relay F closes via the make contacts *f3* and *z5* and back contact *b4* a holding circuit for itself, so that relay F keeps energised after the internal subscriber has released the key on his set, whereby the relays X, Q, R, E are released and relay K is energised again. The direct exchange line coupling circuit is now in the situation F.

If the internal subscriber, after having pushed his key for 3 seconds, would still replace the receiver, relay V is released, so that in the described manner relay U is energised, the relays M and P are released and the connecting means in the house exchange are released again. Furthermore the relays Z and VV are released. Relay Z interrupts via contact *z5* the holding circuit of relay F. Relay F interrupts via contact *f4* the holding circuit for the relays R and Q. However, before relay R is released, relay T is energised via make contact *r2* and the back contacts *vv9* and *b4*. Relay T closes via make contact *t3* and the back contacts *vv9* and *b4* a holding circuit for itself. The direct exchange line transmitter has thus passed from the condition F into the condition T due to the replacement of the receiver by the internal subscriber.

The telephone operator can connect herself to a direct exchange line coupling circuit in the situation F by pushing key FT thus causing energisation of relay FB via make contact *fr2* and the key contact FT. When the key is released, relay GB is again energised, whereafter the control selector BK in the described manner seeks the relative direct exchange line coupling circuit, which in this case is marked in the contact bank of BK via a circuit extending from marking contact KM through lead 8, the back contacts *w1*, *c1*, *d1*, *t1*, make contact *f1*, lead 13, multiple point FM, make contact *fb1* and the back contacts *tb1*, *db1*, *cb1*, *wb1*. After relay PB has been energised in the described manner via the marking circuit when the control selector has reached the direct exchange line coupling circuit, relay PH is energised via make contact *pb2*, whereas the relays GB and FB are de-energised due to back contact *pb3* being opened. However, before relay FB releases its armature, relay IS is energised via make contacts *fb3* and *ph5*. Relay IS closes a holding circuit for itself via the make contacts *ph5* and *is2* and the key contact UT. The relays B and BD in the direct exchange line coupling circuit are now energised via lead 4, contact and wiper KD of control selector BK and the make contacts *is3* and *ph4*. The operator's telephone set TF is thus automatically connected to the internal side of the direct exchange line transmitter via the make contacts *ph1* and *ph2*, wipers and contacts KA and KB of BK, the leads 1 and 2, the make contacts *bd1* and *bd2*, the make contacts *vv7* and *vv8*, and the make contacts *p1* and *p2*. The telephone operator can then talk with the internal subscriber. When the operator selects a direct exchange line coupling circuit in a different condition, her telephone set TF is always automatically connected via the make contacts *ph1* and *ph2*, wipers and contacts KA and KB of BK, the leads 1 and 2, the back contacts *bd1* and *bd2* and the make contacts *z2* and *z1* to the external side of the direct exchange line coupling circuit, since relay IS is not energised. She may in this case be connected at will to the internal side by pushing key IT, as described herein before. After relay B has been energised, back contact *b4* interrupts the holding circuit for relay F.

When a subscriber of the house exchange wishes to establish a calling back connection with another subscriber of this exchange, he pushes the key on his set for a short time, so that the relays Q and R in the coupling circuit are energised, as described before. However, he now does not replace the receiver, so that relay T is not energised and the condition T does not arise and hence the telephone operator is not called into the connection. The first subscriber's set is now connected to the calling-back line RL via the existing connection in the house exchange, the wipers and contacts *a* and *b* of line finder OZ, the make contacts *p1* and *p2*, the capacitors CS1 and CS2, the make contacts *vv1* and *vv2*, the make contacts *q4* and *q5*. The calling-back line RL is connected as an ordinary subscriber's set to an outlet of a number of line finders in a manner which is not shown. Since the line wires of the calling-back line RL are interconnected galvanically via inductance LL2 and the make contacts *v6* and *r1*, the calling-back line RL is marked as calling in the outlets of the group of line finders in known manner which is not shown, one line finder being assigned for seeking the calling line RL. After the calling-back line RL has been connected to a register in the house exchange, the subscriber selects the desired number. The dial contact then interrupts the loop across the subscriber's set several times, so that relay V is released as many times and transmits the dialling pulses via make contact *v6* to the calling-back line RL, so that the register in the house exchange is adjusted and the desired calling-back connection is established.

If the subscriber of the house exchange who had established the calling-back connection wishes to restore the connection with the direct exchange line NL, he again pushes the key on his set for a short time. Relay X is thus energised again, short-circuiting the windings Q2 and R2 via make contact *x1*, the back contacts *b4* and *f4*, and make contact *q3*, so that relay Q is released. Relay R keeps energised via its winding R1 and the make contacts *r4* and *x1*, whereas the winding Q1 remains short-circuited via make contact *r4*, until make contact *x1* opens when the key on the subscriber's set is released, whereupon relay R is also de-energised.

It is also possible that an external calling subscriber wishes to talk with several subscribers of the house exchange in succession. The telephone operator then deals with the call as a series call, that is to say she pushes the control key SIT, thus causing energisation of relay SE in the direct exchange line coupling circuit. Relay SE closes a holding circuit for itself via make contact *se1* and resistor RS. Subsequently, the operator establishes in the described manner a connection between the direct exchange line and the first of the desired internal subscribers. After this call is over, the internal subscriber replaces the receiver and relay V in the direct exchange line coupling circuit is released. Relay U is thus temporarily energised in the described manner, so that the relays M, P, Z, VV are released and the connecting means in the house exchange are released again. However, in this case, relay S is energised via make contact *se3*, back contact *v5*, make contact *vv4* and back contact *b4*. Relay S closes a holding circuit for itself via make contact *se3*, back contact *v5*, make contact *s3* and back contact *b4*. Relay SR in the control desk is energised via the back contacts *w2*, *c2*, *d2*, *t2*, *f2*, back contact *s2*, lead 23 and multiple point SA. Make contact *sr1* switches on the indicator lamp SL. The telephone operator again makes connection with the corresponding direct exchange line by pushing key ST, thus causing energisation of relay SB via make contact *sr2*. The control selector BK is again adjusted in the same manner as above described, but in this case the marking circuit extends from the outlet marking contact KM of BK via the lead 8, the back contacts *w1*, *c1*, *d1*, *t1*, *f1*, the make contact *s1*, lead 14, multiple point SM, make contacts *sb1*, and the back contacts *sb1*, *fb1*, *tb1*, *db1*, *cb1*, *wb1*. The telephone operator can subsequently establish the connection with the next internal subscriber in the described manner. When the last call of a series is reached, she pushes key SUT before leaving the connection, thus causing de-energisation of relay SE due to short-circuiting. If one of the subscribers would be busy or not answer within 20 seconds, either relay C or relay D in the direct exchange line coupling circuit would be energised in the described manner, thus causing lamp CL or DL on the control desk to be ignited and the operator to be called back into the connection.

It is also possible that a subscriber of the house exchange wishes to talk with a subscriber of a public exchange. He then calls the telephone operator in a manner which is not shown, announces his wishes and replaces the receiver. Outlets of selectors of the house exchange through which the operator can be reached may be connected, for example, to determined outlets of the control selector of the operator whilst the control desk comprises a further lamp which starts burning when the operator is called by an internal subscriber. The operator can then make connection with the internal subscriber in a manner as described hereinbefore. If upon answering the call it appears that all direct exchange lines are busy, in which event lamp BL is burning, she notifies the subscriber accordingly. In the opposite case the operator selects a free direct exchange line coupling circuit by pushing key BT, thus causing energisation of relay BB via make contact *br2* and key contact BT. The control selector is adjusted in a manner analogous to that above described, on the understanding that in this case the marking circuit extends from the marking contact KM of a free direct exchange line transmitter via lead 8, the back contacts *w1*, *c1*, *d1*, *t1*, *f1*, *s1*, *h1*, *z1*, *m1*, lead 17, multiple point BM, make contact *bb1* and the back contacts *hb1*, *sb1*, *fb1*, *sb1*, *tb1*, *db1*, *cb1*, *wb1* to earth. After the control selector has been adjusted, the relays BM and Z are energised, thus causing the operator's telephone set TF to be connected to the direct exchange line NL. After the operator has received dialling tone from the remote exchange, she selects the number desired. Subsequently, she makes connection with the internal side of the transmitter by pushing key IT and selects the number of the calling subscriber in the house exchange. The process is analogous to that described for answering an external call.

The control desk by means of a simple switching operation may be adapted to operation by a blind operator. The operation is in this case simplified further by reducing the number of keys to be controlled, whilst also acoustic signalling of the different conditions takes place. For this purpose the switch NT is closed, thus causing energisation of relay N. As mentioned above, the circuits for energising the relays CR, DR, TR, SR, HR are then changed in such manner that never two or more such relays can be energised at a time, that is to say the relays have preference in the said sequence. If, for example, relay CR is energised, none of the relays DR, TR, FR, SR, YR, HR can be energised. However, the condition W is signalled independently of the other situations. The control desk comprises a sound reproducer GW which, if desired, may be combined with the operator's telephone set TF. The sound reproducer GW may be coupled via a transformer TG and make contact *n8* to one of the signal sources LW, LC, LD, LT, LF, LS, LY, LH, LB in such manner that the sound reproducer GW can be coupled to only one of the sources LC, LD, LT, LF, LS, LY, LH at a time. Of the conditions C, D, T, F, S, Y, H there is thus signalled the condition which is considered most preferable at a given moment. The various sources produce different characteristic acoustic signals, for example signals of different frequencies, if desired interrupted in a characteristic rhythm, a ticker signal or determined frequency combinations in characteristic sequence. The waiting condition signal which, if desired, may be given simultaneously with one of the other signals must be chosen to be such that confusion is not possible. If the operator wishes to ascertain whether a free direct exchange line transmitter is available, she pushes key LBT, so that the source LB is connected via make contact *br3*, key contact LBT and make contact *n8* to the transformer TG, if not all of the direct exchange line coupling circuits are busy. However, if free direct exchange lines are not available, the said circuit is interrupted by make contact *br3*. When key LBT is pushed, any circuit leading to one of the other signal sources is opened.

As mentioned before, only the most preferable of the occurring conditions C, D, T, F, S, Y, H is signalled on the control desk at a given moment. The operator can select a direct exchange line coupling circuit in this most preferent condition by pushing arbitrarily one of the keys CT, DT, TT, FT, ST, HT, since the contacts of these keys are interconnected in parallel via the make contacts *n2*, *n3*, *n4*, *n5*, *n6*, *n7*. If at a given moment, for example, one or more direct exchange line transmitters are in the situation C and other direct exchange line coupling circuits are in one or more of the conditions D, T, F, S, Y, H, relay CR only can be energised, as mentioned before, since the circuit for energising the relays DR, TR, FR, SR, YR, HR is interrupted by back contact *cr4*. When the operator pushes one of the keys CT, DT, TT, FT, ST, HT, relay CB is energised, whereafter the adjustment of the control selector BK to a direct exchange line coupling circuit in the condition C proceeds further in the manner as described hereinbefore. The relays DB, TB, FB, SB, HB cannot be energised by pushing one of the said keys, the make contacts *dr2*, *tr2*, *fr2*, *sr2*, *hr2* in this case being open. If there is no direct exchange line transmitter in the situation C, but one or more are in the conditions D and, as the case may be, in one or more of the conditions T, F, S, Y, H, relay DR only is energised, but none of the relays TR, FR, SR, YR, HR is energised, since back contact *dr4* is open. Relay DB is now energised by pushing one of the said selecting keys, the control selector being adjusted to a direct exchange line transmitter in the condition D. When one of the selecting keys is pushed, there is thus automatically chosen a direct exchange line coupling circuit which is in the most urgent situation. Instead of utilising the selecting keys CT, DT, TT, FT, ST, HT, use may be made, if desired, of a single selecting key MT. A direct exchange line coupling circuit in the waiting condition W or a free direct exchange line coupling circuit must be chosen in the original way by pushing the key WT or BT.

If two or more operators in a house exchange can control the same direct exchange lines, it is desirable that a certain connection between the direct exchange line coupling circuit and the operator should be maintained after an operator has answered a call. This is the case more particularly if the direct exchange line coupling circuit comes in one of the conditions W, C, D, S, since the operator then disposes of the information which is necessary to deal further with the direct exchange line coupling circuit. In the condition T or F it is not necessary for the operator having established the call to cut in again, since in this case another operator can give the required assistance as well.

An extension of the circuit-arrangement shown in Figs. 1 and 2 in the event of two or more control desks in the house exchange being available is shown in Fig. 3.

Three control desks are indicated by TFA, TFB, TFC. Part of the direct exchange line coupling circuit NLO in the upper portion of the figure is shown. The direct exchange line coupling circuits in this case each comprise a certain number of relays each corresponding to a determined control desk. Thus, the relays AN and BN correspond to the control desks TFA and TFB respectively. The relay corresponding to control desk TFC is not shown, but is connected in a similar manner. The direct exchange line coupling circuits NLO as far as the part is concerned which is not shown, are of a similar design as in the circuit-arrangement shown in Fig. 1. The control desks are also designed similarly to those shown in Fig. 2. The outlet contacts to be wiped by the wipers KA, KB, KC, KD, KE, KF, KG, KM, of which KM only is shown in Fig. 3, are multipled in known manner to corresponding contacts of the control selectors of other control desks. The control selectors BK in this case each comprise an additional wiper KNA, KNB, etc. The contacts wiped by this wiper are not multipled to corresponding contacts of other control selectors, but are connected via lead 27 to the control desk relay AN or BN, etc., corresponding to the control desk concerned, in the various direct exchange line coupling circuits. The marking contacts KM, when the direct exchange line coupling circuit is in a determined situation, may be connected again via contacts *w*1, *c*1, *d*1, *t*1, *f*1, *s*1, *h*1, *y*1 of the situation relays to the multiple points WM, CM, DM, TM, FM, SM, HM, YM of the various control desks. However, between the leads 9, 10, 11, 14 and the multiple points WM, CM, DM, SM of the various control desks there are in this case connected make contacts such as *bn*2, *bn*3, *bn*4, *bn*5 of the relays corresponding to these control desks. The multiple points WM, CM, DM, SM can thus be connected to the marking contact of a determined direct exchange line coupling circuit only if the relay AN or BN etc. corresponding to this control desk is energised. Between the leads 18, 19, 20, 23 in the various direct exchange line transmitters and the multiple points WA, CA, DA, SA of the control desks there are included make contacts such as *bn*6, *bn*7, *bn*8, *bn*9 of the relays associated with these control desks, so that the relays WR, CR, DR, SR of a control desk can be energised via one of make contacts *w*2, *c*2, *d*2, *s*2 of a determined direct exchange line coupling circuit only if the relay BN or AN, etc. corresponding to this control desk is energised. The connection with the multiple points TM, FM, HM, YM, BM, TA, FA, YA, HA, WA of the various control desks and the direct exchange line coupling circuits are quite analogous to those shown in Figs. 1 and 2.

When an external call is received in one of the direct exchange line coupling circuits NLO, either the relay HR or relay HR together with relay YR is energised in the various control desks in a manner as has been described with reference to Figs. 1 and 2. One of the operators, for example that of control desk TFB, answers the call in the manner described before. After having adjusted her control selector to the direct exchange line coupling circuit concerned, the relay BN corresponding to the control desk is energised via lead 27, contact and wiper KNB and make contact *ph*10. Relay BN initiates via make contact *bn*1 a holding circuit for itself, which is closed via make contact *m*10, as soon as the direct exchange line transmitter is connected to a line finder, or via make contact *w*5, if the operator temporarily brings the direct exchange line coupling circuit into the waiting condition W. The relay BN keeps held until the called subscriber answers, in which event back contact *v*7 opens the holding circuit. The relay BN is allowed in this case to be released, since the conditions W, C and D cannot arise again after the called subscriber has answered, so that the connection between the direct exchange line coupling circuit and the operator can be eliminated. If, however, it appears in answering the call that a series call is concerned, the connection must also be maintained after the called subscriber has answered. In this case the holding circuit of relay BN remains closed via the make contacts *bn*1 and *se*4, independently of contact *v*7. If the direct exchange line coupling circuit would come into one of the conditions W, C, D, S after the call has been answered by the operator, the control desk relay BN is still energised. These conditions are thus signalled only on the control desk of the operator who has controlled the direct exchange line coupling circuit, since the make contacts *bn*6, *bn*7, *bn*8, *bn*9 are closed, but the corresponding contacts of the control desk relays AN, etc. between the leads 18, 19, 20, 23 and the multiple points WA, CA, DA, SA of the other control desks are open. The operator of the control desk TFB can connect herself in the described manner to the direct exchange line coupling circuit NLO, but the other operators cannot do so, since there is no connection between the leads 9, 10, 11, 14 and the multiple points WM, CM, DM, SM associated with these control desks.

If there are a plurality of operators, the difficulty could arise that the control selector of an operator stops with a direct exchange line coupling circuit which is in a condition chosen by another operator and thus marked. The condition chosen by the first operator need not be similar to that chosen by the other operator. The first operator would thus be connected to a direct exchange line coupling circuit which is in a condition not expected. In order to prevent this, the circuit-arrangement is further so designed, that only one control selector can find a direct exchange line coupling circuit at a time. This is not objectionable, since the time of adjustment of a selector is very short, for example of the order of 1/5 sec.

The operation of this circuit-arrangement is the following. If an operator, for example of control desk TFB, controls one of the selecting keys WT, CT, DT, TT, FT, ST, HT, BT, relay GB of the control desk is energised, as described with reference to Figs. 1 and 2. This causes relay UB in the control desk TFB to be energised in a circuit extending from (−) battery via resistor RA, the windings UB2 and UB1 of relay UB, make contact *gb*6 and back contact *gba*6 in control desk TFA to earth. The contacts *gba*6 and *gbc*6 in the control desks TFA and TFC correspond to the contact *gb*6 in control desk TFB. Relay UB closes a holding circuit for itself via resistor RA, winding UB2 and the make contacts *gb*7 and *ub*1. The windings UA1, UB1, UC1 have comparatively high impedances and the windings UA2, UB2, UC2 have comparatively low impedances. If the operator of control desk TFA would select a direct exchange line coupling circuit at the same moment, the relay GBA in this control desk, which corresponds to the relay GB of control desk TFB, is energised. Relay UA in control desk TFA cannot operate, however, since the windings UA1 and UA2 are connected via make contact *gba*6 in parallel to the low-ohmic winding UB2 in series with the contacts *gb*7 and *ub*1. If the operator of control desk TFC would select a direct exchange line transmitter after relay UB has been energised, relay UC cannot be energised due to the circuit for energising this relay, which circuit would have to extend via the resistor RA, the windings UC2 and UC1, make contact *gbc*6, back contacts *gb*6 and *gba*6, being interrupted by back contact *gb*6. Thus, only one of the relays UA, UB, UC can be energised at a time. Contacts of the said relays are included in the test circuit, the marking circuit and the energising circuit for the rotary magnet in the various control desks. Thus, for example, in control desk TFB, the make contact *ub*2 is included in the circuit for energising rotary magnet DM. The rotary magnet DM, after relay GB has been energised, can thus be energised only if relay UB is also energised. Make contact *ub*3 is included in the circuit which can connect the multiple points WM, CM, DM, TM, FM, SM, HM, YM to earth. The control desk TFB can thus mark outlets of the control selector BK only if relay UB is energised. Since relay UA or UC cannot be energised simultaneously with relay UB, another control desk, on the other hand, cannot mark outlets if relay UB is energised. The test circuit extending via marking contact and wiper KM of the control selector BK, winding of test relay PB, make contact *gb*2 and back contact *pk*1 is closed via make contact *ub*4 only after relay UB has been energised. Relay PB thus cannot respond if the control selector would happen to be in a condition in which the marking contact KM would be marked by another control desk.

The circuit-arrangement may be modified in different ways within the scope of the invention.

Thus, the indicator lamps WL, CL, DL, TL, FL, SL, HL, BL may alternatively be connected directly to the multiple points WA, CA, DA, TA, FA, SA, HA, BA instead of being controlled by relays WR, CR, etc. Furthermore, the outlets of the control selector BK may alternatively be marked by selective marking instead of by marking conductors. In this case the marking contact associated with a direct exchange line transmitter exhibits a characteristic electrical condition, for example a voltage, an alternating voltage of determined frequency or phase, an impedance, etc., which electrical condition differs from the various conditions in which the direct exchange line coupling circuit can be. These various electrical conditions, for example voltages, are supplied to the corresponding marking contact via contacts of relays of which the energisation condition is dependent upon the condition of the associated direct exchange line coupling circuit. The control selector must then select in known manner a direct exchange line transmitter of which the marking contact exhibits the electrical condition which is characteristic of the direct exchange line condition chosen by the operator.

What is claimed is:

1. A telephone system comprising at least two telephone exchanges and a plurality of direct exchange lines connected between said exchanges, at least one of said exchanges comprising a plurality of direct exchange line coupling circuits connected respectively to said direct exchange lines and each adapted to assume a plurality of different conditions requiring the attention of a telephone operator, at least one operator control position for controlling said line coupling circuits and comprising a plurality of indicating means for indicating said different conditions, each of said indicating means being connected in common to all of said line coupling circuits so as to indicate whenever the respective condition occurs in at least one of said line coupling circuits, and selecting means for connecting said operator control position to whichever line coupling circuit is in said respective indicated condition.

2. A system as claimed in claim 1, in which said operator control position comprises a plurality of signalling relays corresponding to said plurality of different conditions and respectively connected to control said plurality of indicating means and each having an energization circuit connected to all of said line coupling circuits, each of said line coupling circuits comprising a plurality of relays respectively connected to energize the corresponding said energization circuit when any of said conditions occurs.

3. A system as claimed in claim 1, in which said selecting means comprises a control selector adapted to selectively connect said operator control position to said plurality of line coupling circuits and comprising outlet terminals respectively connected to said line coupling circuits, marking circuit means for producing different marking signals in accordance with said plurality of different conditions in each of said line coupling circuits, and actuating means responsive to said marking signals and connected to connect said control selector to the outlet terminal thereof corresponding to the line coupling circuit which is in the marked condition.

4. A system as claimed in claim 3, including a plurality of multiple-wired points corresponding respectively to said plurality of conditions and each connected in common to all of said line coupling circuits, a test circuit connected to one of said multiple-wired points and adapted to be actuated by said selecting means, and means responsive to the occurrence of one of said conditions in one of said line coupling circuits for connecting the multiple-wired point which corresponds to said last-mentioned condition to the outlet terminal of said control selector which is connected to the last-mentioned line coupling circuit, thereby closing said test circuit.

5. A system as claimed in claim 3, in which said operator control position comprises an operator's telephone coupled to said selecting means so as to be capable of being selectively connected to a line coupling circuit which is in one of said conditions, and means connected to interrupt said connection of the operator's telephone immediately in the event that said selecting means is actuated for connecting said operator's telephone to another one of said line coupling circuits.

6. A system as claimed in claim 5, including a first relay, a second relay connected to be energized when a line coupling circuit is internally through-connected and having back contacts connected to said first relay via said control selector, means responsive to said selecting means and connected in series circuit with said first relay to cause said first relay to be energized when a connection is interrupted between an operator control position and a line coupling circuit which last-named connection is not internally through-connected, contacts associated with said first relay and connected to provide an interconnection between the leads of the direct exchange line concerned, and signalling means at said operator control position to indicate when said last-mentioned interruption occurs.

7. A system as claimed in claim 6, including means connected to release said first relay when said operator control position is connected to a line coupling circuit which is in a waiting condition.

8. A system as claimed in claim 3, including means connected for testing said marking signals, and means connected to render said testing means operative only after said control selector has changed from an assumed position.

9. A system as claimed in claim 3, including an internal subscriber line, switching means for selectively connecting said internal subscriber line to one of said direct exchange lines via the associated line coupling circuit, an operator's telephone positioned at said operator control position, and means for connecting said operator's telephone to said line coupling circuit when said operator control position is connected to said line coupling circuit, said last-named means being arranged to connect said operator's telephone to said subscriber line if said subscriber line is connected to said direct exchange line and to said direct exchange line if said subscriber line is not connected to said direct exchange line.

10. A system as claimed in claim 3, in which at least two of said operator control positions are connected to control said plurality of line coupling circuits, and in which each of said line coupling circuits comprises a plurality of relays associated respectively with different ones of said operator control positions, means for operating the associated one of said relays in a line coupling circuit when a given operator control position is connected to said last-mentioned line coupling circuit, said relays including contacts connected to feed some of said marking signals to only one of said operator control positions and further contacts connected to couple the selecting means of only said last-mentioned operator control position to said last-mentioned line coupling circuit.

11. A system as claimed in claim 1, in which said attention-requiring conditions have a predetermined sequence of preference over one another, and including means connected to said indicating means for causing the more preferable condition to be indicated in the event that a plurality of said conditions occur simultaneously, and means connected to said selecting means for causing said operator control position to be connected to the line coupling circuit in which said more preferable condition occurs.

12. A system as claimed in claim 1, in which said indicating means respectively comprise means for producing audible sounds.

References Cited in the file of this patent

UNITED STATES PATENTS

| | | |
|---|---|---|
| 2,358,237 | Lewis et al. | Sept. 12, 1944 |
| 2,365,996 | Bakker | Dec. 26, 1944 |